R. H. LONG.
Car Truck.

No. 43,739.                                      Patented Aug. 2, 1864.

Witnesses:
Henry Morris
J. W. Coombs

Inventor:
R. H. Long
By Munn & Co
Att'ys

UNITED STATES PATENT OFFICE.

ROBERT H. LONG, OF PHILADELPHIA, PENNSYLVANIA, ASSIGNOR TO HIMSELF, JOSEPH GRICE, OF NEW YORK, N. Y., AND SAMUEL B. GRICE, OF PHILADELPHIA, PENNSYLVANIA.

IMPROVEMENT IN LOCOMOTIVE CAR-TRUCKS.

Specification forming part of Letters Patent No. 43,739, dated August 2, 1864.

*To all whom it may concern:*

Be it known that I, ROBERT H. LONG, of the city of Philadelphia, in the county of Philadelphia and State of Pennsylvania, have invented a new and useful Improvement in the Running-Gear of Railroad Cars and Locomotives; and I do hereby declare that the following is a full, clear, and exact description of the same, reference being had to the accompanying drawings, forming part of this specification, in which—

Figure 1:
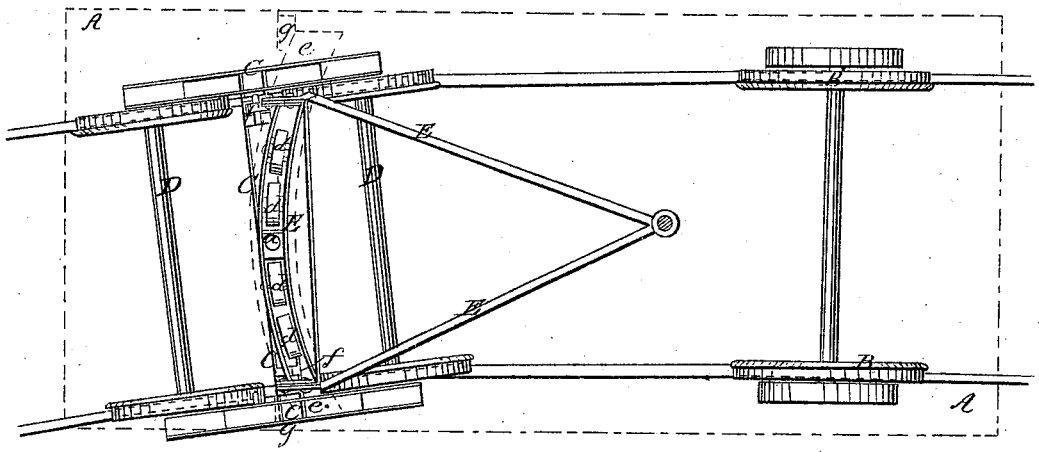
Figure 2:
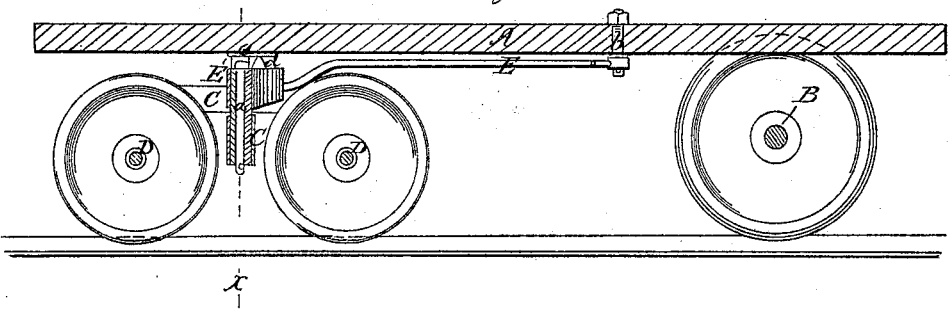
Figure 3:
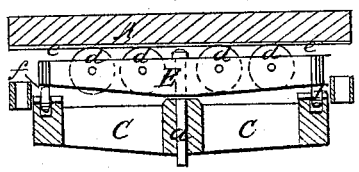

Figure 1 is a top view of the running-gear of a car illustrating my invention, the bottom or main frame of the car being shown in red outline. Fig. 2 is a central longitudinal section of the running-gear and bottom of the car. Fig. 3 is a transverse vertical section of the same in the plane indicated by the line $x$ $x$ in Fig. 2.

Similar letters of reference indicate corresponding parts in all the figures.

The object of this invention is to enable railroad cars or locomotives to turn or "curve" more freely, more especially on curves of short radius, such as are used in city railroad tracks; and to this end it consists in the combination, at one end of the car or locomotive, of a four-wheel truck or frame and a vibrating truck or frame, the four-wheel truck or frame having the axles arranged within it in the usual manner, and being pivoted between the axles to the vibrating truck or frame, and the latter being pivoted to the main frame or body of the car or locomotive at a point not over or between the axles.

To enable others skilled in the art to make and use my invention, I will proceed to describe its construction and operation.

A is the main frame or bottom of the car-body. At the forward end a pair of wheels, B B, is represented as applied without a truck, and my invention is represented applied at the rear end, this being the arrangement for city cars. In long eight-wheel cars, however, I propose to apply my invention at each end of the car.

C is the truck, constructed substantially like an ordinary four-wheel truck, and having its axles D D and center-bolt $a$ arranged in the usual manner; but the said bolt, instead of pivoting the said truck directly to the car-body, pivots it to the vibrating truck or frame E E', which is pivoted to the car-body by a bolt, $b$, at a point some distance in front of the truck C, in a line passing longitudinally through the center of the car. The rear end of the car-body is supported on a series of rollers, $d$ $d$, the axles or journals of which are arranged in bearings in the arc-formed portion E' of the vibrating truck or frame, which is concentric with the bolt $b$, and through which the bolt $a$ passes. The portion of the bottom of the body which bears upon the said rollers is faced with a plate of iron, $e$. The vibrating truck or frame E E' is supported upon the lower truck, C, by means of two rollers, $f$ $f$, the axles or journals of which are fitted to bearings provided at the ends of the bolster of the said truck C, and in this way the weight of the rear end of the car is transmitted to the truck C.

In turning curves the truck-axles D D are permitted to have two movements—viz., the movement with the lower truck, C, about the bolt $a$, and the movement with the upper or vibrating truck about the bolt B; and hence their wheels adapt themselves more easily to the rails, and in turning short curves so much of the body of the car is not allowed to hang over the outside of the truck as is the case when only a centrally-pivoted truck, like C, or a vibrating truck, like E E', is employed singly.

At or near each side of the frame A there is secured a stop, $g$, to prevent the truck or frame E E' from vibrating farther than is necessary.

The invention is applied to a locomotive in the same manner as to a car, and may be applied to either end, according to the arrangement of the driving wheels.

What I claim as my invention, and desire to secure by Letters Patent, is —

The combination, at one end of the car or locomotive, of a four wheel truck, C, and a vibrating truck, E E', pivoted together and to the car-body in the manner as and for the purpose herein set forth.

ROBT. H. LONG.

Witnesses:
GEO. W. GRICE,
SAM. B. GRICE.